United States Patent [19]

Marshall et al.

[11] 4,393,118
[45] Jul. 12, 1983

[54] METHOD OF PREPARING A DARK BODY PHOSPHOR

[75] Inventors: Harry L. Marshall; Alan R. Schwartz, both of Towanda, Pa.

[73] Assignee: GTE Products Corporation, Stamford, Conn.

[21] Appl. No.: 322,330

[22] Filed: Nov. 18, 1981

[51] Int. Cl.³ .......................... B05D 5/06; B05D 5/12
[52] U.S. Cl. .................................... 428/403; 428/404; 427/64; 427/68
[58] Field of Search ................... 427/64, 68, 217, 218; 428/404, 403, 405

[56] References Cited

U.S. PATENT DOCUMENTS 4,020,231 10/1982 Hedler ................................. 428/403
4,219,587 8/1980 Oba ..................................... 427/218

Primary Examiner—Sam Silverberg
Attorney, Agent, or Firm—J. Theodosopoulos

[57] ABSTRACT

A pigmented phosphor is prepared by coating phosphor particles with a coating of finely powdered carbon and colloidal silica.

8 Claims, No Drawings

METHOD OF PREPARING A DARK BODY PHOSPHOR

This invention is concerned with phosphors for cathode ray tubes. it is particularly concerned with the coating of phosphor particles with pigments in order to enhance image contrast in cathode ray tubes, as disclosed in U.S. Pat. Nos. 3,875,449, 3,886,394, 4,020,231, 4,021,588, 4,049,845, 4,128,674, 4,172,920 and 4,209,567. The pigments disclosed in said patents are red, blue, green or yellow. In the instant invention, however, the pigment is black. A problem with the use of a dark pigment is the attainment of uniform adherence of the pigment to the phosphor particles. This invention discloses a process that provides uniform adherence of a dark pigment to the phosphor particles. One example of a pigment used is carbon, in the form of colloidal graphite. A colloidal silica is also used to aid in binding the carbon to the phosphor particles.

In a specific example for copper-silver-activated zinc sulfide phosphor, Type P39, used in a data display tube which required high contrast for use in high ambient light conditions, the phosphor was coated as follows. Three pounds of particulate phosphor per gallon of deionized water was agitated at 35°–40° C. until all the phosphor was in suspension. The pH of the suspension was adjusted to 4–5 with dilute sulfuric acid. A colloidal dispersion of graphite was then added in the amount of 0.0005 pounds of graphite per pound of phosphor. In one example, about 300 ml of Aquadag E, made by Acheson Colloids Corp., was added per three pounds of phosphor. Aquadag E is a concentrated colloidal dispersion of pure electric-furnace graphite in water, having a solids content of 22%, an average particle size of 0.5 microns and a maximum particle size of 4 microns. The graphite-phosphor suspension was agitated for one hour and the pH was then adjusted to 8–9 with dilute ammonium hydroxide. After the pH had stabilized, aqueous colloidal silica was added, in the amount of about 0.003 pounds of silica per pound of phosphor. In one example, the silica was Ludox 130M, made by E. I. DuPont Co., which was an acidic colloidal sol of positively charged silica containing about 26% silica and 4% alumina. In this example, 30 ml of 10 fold diluted Ludox 130M was added per pound of phosphor. The suspension was agitated for one hour and then allowed to settle. After decantation and filtering, the coated phosphor was dried in trays in an oven at 350° F.

We claim:

1. A method of making pigmented phosphor comprising the steps of: preparing an aqueous suspension of phosphor particles and finely powdered carbon; adding colloidal silica to the suspension; agitating the suspension; removing the liquid and drying the phosphor particles.

2. The method of claim 1 wherein the pH of the phosphor-carbon suspension is adjusted to 8–9 prior to the addition of the colloidal silica.

3. The method of claim 1 wherein the phosphor-carbon suspension is prepared by preparing an aqueous suspension of the phosphor particles, adjusting the pH thereof to 4–5, and then adding thereto a colloidal dispersion of graphite.

4. The method of claim 1 wherein the phosphor is a data display tube phosphor.

5. Phosphor made in accordance with claim 1.

6. A pigmented phosphor comprising a core of a phosphor particle having a black coating thereon wherein the black coating is finely powdered carbon.

7. A phosphor of claim 6 wherein the phosphor is a data display tube phosphor.

8. The phosphor of claim 7 wherein the phosphor is copper-silver-activated zinc sulfide.

* * * * *